United States Patent
Kreuzer et al.

(10) Patent No.: US 10,437,228 B2
(45) Date of Patent: Oct. 8, 2019

(54) ELECTRONIC TOOL UNLOCKING SYSTEM

(71) Applicant: Ridge Tool Company, Elyria, OH (US)

(72) Inventors: Rudolf Kreuzer, Buchs (DE); Harald Krondorfer, Aurora, OH (US); Frederick D. Pond, Lagrange, OH (US)

(73) Assignee: Ridge Tool Company, Elyria, OH (US)

( * ) Notice: Subject to any disclaimer, the term of this patent is extended or adjusted under 35 U.S.C. 154(b) by 472 days.

(21) Appl. No.: 14/665,088

(22) Filed: Mar. 23, 2015

(65) Prior Publication Data

US 2015/0286209 A1    Oct. 8, 2015

Related U.S. Application Data

(60) Provisional application No. 61/973,932, filed on Apr. 2, 2014.

(51) Int. Cl.
| | |
|---|---|
| *G05B 19/4063* | (2006.01) |
| *G07C 3/08* | (2006.01) |
| *G07C 9/00* | (2006.01) |
| *B25F 5/00* | (2006.01) |

(52) U.S. Cl.
CPC ............ *G05B 19/4063* (2013.01); *B25F 5/00* (2013.01); *G07C 3/08* (2013.01); *G07C 9/00166* (2013.01); *G05B 2219/50206* (2013.01)

(58) Field of Classification Search
CPC ................. B25F 5/00; G05B 19/4063; G05B 2219/50206; G07C 3/08; G07C 9/00166
See application file for complete search history.

(56) References Cited

U.S. PATENT DOCUMENTS

| | | | |
|---|---|---|---|
| 6,005,489 A | 12/1999 | Siegle et al. | |
| 6,872,121 B2 | 3/2005 | Wiesner et al. | |
| 7,119,686 B2 | 10/2006 | Bertness et al. | |
| 7,298,240 B2 | 11/2007 | Lamar | |
| 7,339,477 B2 | 3/2008 | Puzio et al. | |
| 7,394,347 B2 | 7/2008 | Kady | |
| 7,608,790 B2 | 10/2009 | Patton | |
| 8,169,298 B2 | 5/2012 | Wiesner et al. | |
| 8,423,180 B1 * | 4/2013 | Frederick | G06Q 10/087 700/236 |
| 8,542,090 B2 | 9/2013 | Calvet et al. | |
| 9,055,033 B2 | 6/2015 | Mergener | |

(Continued)

FOREIGN PATENT DOCUMENTS

| | | |
|---|---|---|
| AU | 2012258380 | 6/2013 |
| AU | 2012258380 A1 | 6/2013 |

(Continued)

OTHER PUBLICATIONS

China: Office Action dated Jun. 1, 2017; Application No. 201580008488.5; 31 pages.

(Continued)

*Primary Examiner* — Omeed Alizada
(74) *Attorney, Agent, or Firm* — Mark E. Bandy; Rankin, Hill & Clark LLP

(57) ABSTRACT

Systems and methods are described for governing and monitoring operations of tools. The systems include a registration and control computer, one or more mobile devices, and one or more tools. The tools include electronic locking provisions which upon activation selectively enable tool operation.

22 Claims, 7 Drawing Sheets

(56) References Cited

U.S. PATENT DOCUMENTS

| | | | |
|---|---|---|---|
| 9,070,279 B2 | 6/2015 | Shimizu et al. | |
| 2009/0015372 A1 | 1/2009 | Kady | |
| 2009/0138116 A1 | 5/2009 | Austin et al. | |
| 2009/0251330 A1 | 10/2009 | Gerold et al. | |
| 2010/0176919 A1* | 7/2010 | Myers | G07C 9/00571 340/5.73 |
| 2013/0109375 A1 | 5/2013 | Zeiler et al. | |
| 2013/0257589 A1* | 10/2013 | Mohiuddin | G08C 17/02 340/5.61 |
| 2013/0328661 A1 | 12/2013 | Phillips et al. | |
| 2014/0006295 A1 | 1/2014 | Zeiler et al. | |
| 2014/0070924 A1 | 3/2014 | Wenger et al. | |
| 2014/0107853 A1 | 4/2014 | Ashinghurst et al. | |
| 2014/0151079 A1 | 6/2014 | Furui et al. | |
| 2014/0158389 A1 | 6/2014 | Ito et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2014/0240125 A1 | 8/2014 | Burch et al. | |
| 2014/0367134 A1 | 12/2014 | Phillips et al. | |
| 2014/0379136 A1 | 12/2014 | Schlegel et al. | |
| 2015/0244807 A1 | 8/2015 | Shoemake et al. | |

FOREIGN PATENT DOCUMENTS

| | | |
|---|---|---|
| CN | 1641174 A | 7/2005 |
| CN | 101023450 | 8/2007 |
| CN | 101419727 A | 4/2009 |
| CN | 102609665 A | 7/2012 |
| EP | 1273723 | 1/2003 |
| EP | 2680093 | 1/2014 |
| GB | 2418252 | 3/2006 |
| WO | WO0171642 A2 | 9/2001 |
| WO | 2006003455 | 1/2006 |
| WO | WO 2011077001 | 6/2011 |
| WO | 2013014890 | 1/2013 |
| WO | 2014005097 | 1/2014 |
| WO | 2015061370 | 4/2015 |

OTHER PUBLICATIONS

International Search Report (ISR) and Written Opinion; PCT/US2015/23243 ; dated Jul. 8, 2015 (11 pages).
http://news.thomasnet.com/fullstory/theft-protection-system-eliminates-missing-tools-469258 (4 pages), Nov. 8, 2015.
Extended European Search Report dated Oct. 6, 2017; Application No. 15772767.8; 9 pages.

* cited by examiner

ELECTRONIC TOOL UNLOCKING SYSTEM

CROSS REFERENCES TO RELATED APPLICATION

This application claims priority upon U.S. provisional application Ser. No. 61/973,932 filed Apr. 2, 2014.

FIELD

The present subject matter relates to tools and particularly power tools, systems utilizing such tools, and methods for governing and monitoring tool use.

BACKGROUND

Remote activation systems are known in the art and have been used in electronic devices such as digital cameras, laptop computers, and other electronic instruments. Although satisfactory in many respects, these systems often require lengthy or intricate set-up or initialization procedures for the purchaser or owner of the device. In addition, depending upon the features of the remote activation system, such systems may also be expensive and significantly increase the cost of the device into which they are incorporated.

Remote activation and tracking systems have also been applied to tools for example in order to track location of a tool within a facility or to monitor use of the tool. Again, although such systems have been found to be useful in certain aspects, it can be difficult to incorporate tools into such a system and use the tools without undue interruption. In addition, such systems may also increase the cost of the tools.

Industrial or construction jobsites are not conducive for the use of remote activation and tracking systems for tools, particularly if the systems use sophisticated electronic circuitry and software. Such jobsites are typically field-based, and may be susceptible to power outages or lack of a reliable source of electrical power. Thus many remote activation systems which require continuous communication cannot be used. For example, U.S. Pat. No. 7,298,240 is directed to a system for electronically and remotely enabling devices such as tools. Although satisfactory for certain environments, the system of the '240 patent requires the presence of a wireless signal provided by an electronic key. As previously noted, for many field-based jobsites, it is not practical and in many instances not possible to provide a wireless signal to be present at all times and/or at all locations of a jobsite.

In addition, such jobsites often experience adverse environmental conditions such as exposure to rain, snow, high and/or low temperatures, and dirt and mud. Furthermore, jobsites may experience electrical interruption or interference. Exposure to such conditions can interfere with wireless communication during use of tools at a jobsite.

Furthermore, users of tools at such jobsites in many instances are not the owners of such tools and so their use and handling of the tools may not be with the utmost care or in a manner so as to promote wireless communication with tools at a jobsite. Additionally, tool users at such jobsites are typically not motivated to ensure incorporation of tools into an electronic remote activation or tracking system. And so in many instances, users may bypass the electronic system and thereby use the tools in an unauthorized manner.

Electronic theft protection systems for tools are known such as provided by Hilti Inc. The Hilti TPS system consists of a company card, activation key, and an electronic module inside the tool. A unique theft protection code is set initially in each tool using the company card. Authorized users unlock the tool by holding the activation key to the tool to unlock the tool. If the tool is stolen, it will lock after 20 minutes and can not be restarted without the activation key. Although satisfactory in certain aspects, implementation and use of the system at a jobsite and/or with multiple tools becomes cumbersome because separate cards are required for each tool. Furthermore, if the activation key is lost or stolen, the tool is unusable.

In view of these and other concerns, a need remains for provisions and related methods whereby tools can be remotely enabled and which do not require the presence of a wireless signal, with minimal or no involvement from the tool user, and which provisions are inexpensive and relatively easy to implement and maintain.

SUMMARY

The difficulties and drawbacks associated with previously known systems are addressed in the present tools, systems, and methods according to the present subject matter.

In one aspect, the present subject matter provides a method for governing use of a tool. The method comprises providing a system including (i) a registration and control component, (ii) at least one mobile device, and (iii) at least one tool including communication provisions and electronic locking provisions. The method also comprises registering the tool with the registration and control component. The method additionally comprises selecting at least one parameter to govern tool operation. The method also comprises transmitting the parameter to the tool to govern tool operation. The tool remains operational until disabled based upon the selected parameter and without receipt of a deactivation signal.

In another aspect, the present subject matter provides a method for governing use of a tool. The method comprises providing a system including (i) a registration and control component, (ii) at least one mobile device, and (iii) at least one tool including data storage provisions, communication provisions, and electronic locking provisions. The method also comprises specifying a maximum amount of cumulative time during which the tool is operational. The method additionally comprises storing the specified maximum amount of cumulative time during which the tool is operational in the data storage provisions of the tool. The method further comprises resetting a timer thereby causing the electronic locking provisions to enable tool operation. The method also comprises during tool operation, measuring a cumulative time of tool operation. And, the method comprises comparing the measured cumulative time of tool operation to the specified maximum amount of cumulative time during which the tool is allowed to be operational. If the measured cumulative time of tool operation is greater than the specified maximum amount of cumulative time during which the tool is allowed to be operational, the method causes the electronic locking provisions to disable tool operation.

In another aspect, the present subject matter provides a method for governing use of a tool. The method comprises providing a system including (i) a registration and control component, (ii) at least one mobile device, and (iii) at least one tool including data storage provisions, communication provisions, and electronic locking provisions. The method also comprises specifying a maximum cumulative number of actuation cycles during which the tool is operational. The method additionally comprises storing the specified maximum cumulative number of actuation cycles during which the tool is operational in the data storage provisions of the tool. The method further comprises resetting a counter thereby causing the electronic locking provisions to enable tool operation. The method also comprises during tool operation, counting a cumulative number of actuation cycles. And, the method further comprises comparing the counted cumulative number of actuation cycles with the specified maximum cumulative number of actuation cycles during which the tool is operational. If the counted cumulative number of actuation cycles is greater than the specified maximum cumulative number of actuation cycles during which the tool is allowed to be operational, the method causes the electronic locking provisions to disable tool operation.

In still another aspect, the present subject matter provides a method for governing use of a tool. The method comprises providing a system including (i) a registration and control component, (ii) at least one mobile device, and (iii) at least one tool including communication provisions and electronic locking provisions. The method also comprises specifying a maximum amount of cumulative time during which the tool is operational and a maximum cumulative number of actuation cycles during which the tool is operational. The method additionally comprises storing the specified maximum amount of cumulative time during which the tool is operational and the maximum cumulative number of actuation cycles during which the tool is operational in the data storage provisions of the tool. The method also comprises during tool operation, measuring a cumulative time of tool operation and counting a cumulative number of actuation cycles. The method additionally comprises comparing the measured cumulative time of tool operation to the specified maximum amount of cumulative time during which the tool is allowed to be operational and comparing the cumulative number of actuation cycles with the specified maximum cumulative number of actuation cycles during which the tool is allowed to be operational. Upon a first occurrence of (a) the measured cumulative time of tool operation being greater than the specified maximum amount of cumulative time during which the tool is allowed to be operational and (b) the cumulative number of actuation cycles being greater than the specified maximum cumulative number of actuation cycles during which the tool is allowed to be operational, the method causes the electronic locking provisions to disable tool operation.

In yet another aspect, the present subject matter provides a system for governing use of a tool. The system comprises a registration and control component having data storage provisions and communication provisions. The system also comprises at least one mobile electronic device including data storage provisions, communication provisions, user interface provisions, and control provisions. The mobile device is capable of communication with the registration and control component. The mobile device is also capable of transmitting an actuation signal that includes an actuation code. And, the system also comprises a tool having data storage provisions, communication provisions, and actuatable electronic lock provisions. The tool is capable of communication with the mobile device and receiving the actuation signal from the mobile device. The electronic lock provisions are configured to enable operation of the tool upon receipt of the actuation code.

And yet in still another aspect, the present subject matter provides a tool that includes activatable electronic locking provisions which are initially provided in (i) a deactivated state thereby allowing tool operation or (ii) with parameters set to allow infinite use.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
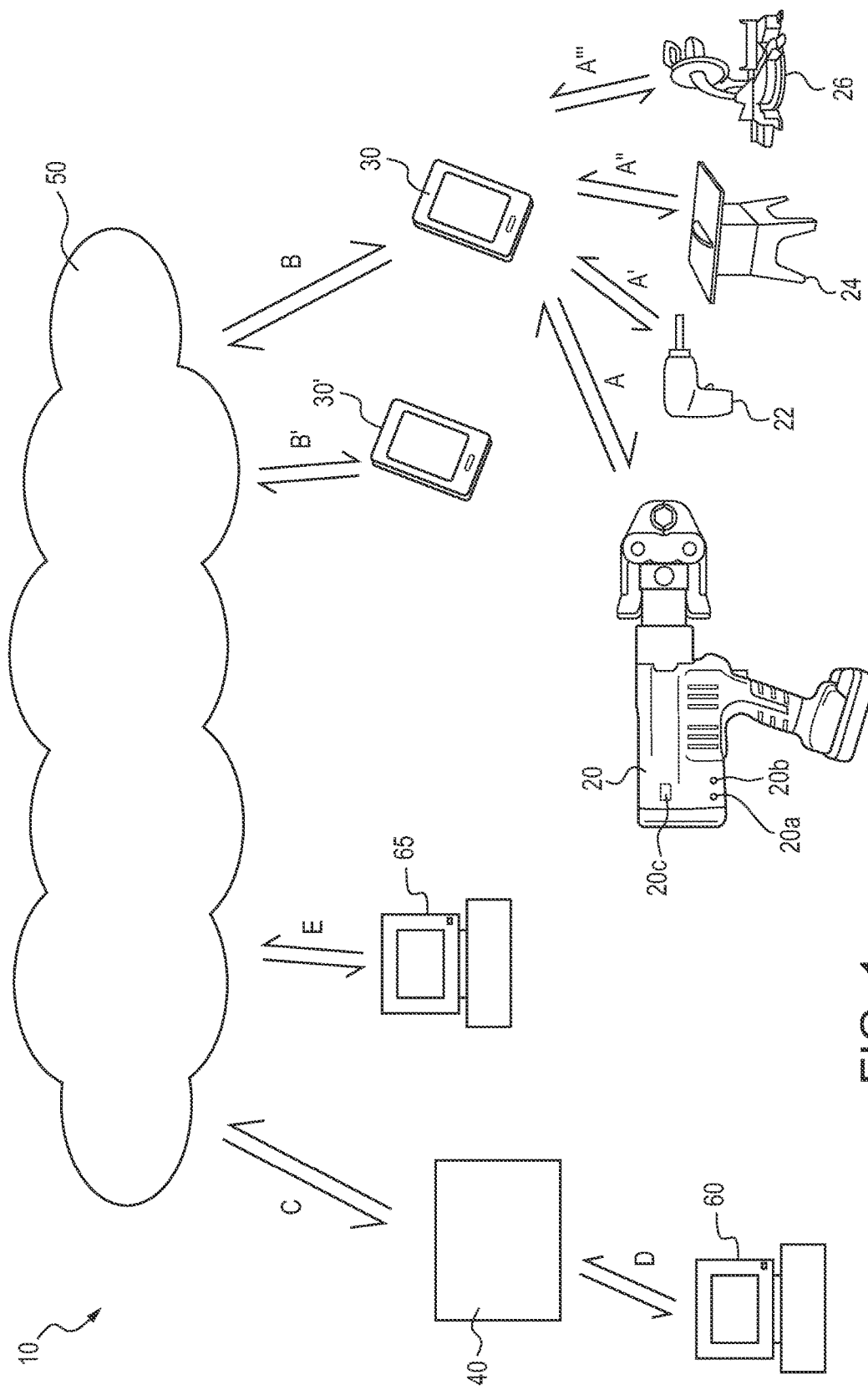
FIG. 1 is a schematic illustration of a system for governing and/or monitoring tool use in accordance with the present subject matter.

The present subject matter provides systems and methods which govern use of one or more tools by utilizing an activation or actuation signal or transmission which enables subsequent tool operation. After receipt of the initial signal by the tool, the tool does not require any further communication, and particularly does not require the presence of a continuous signal for subsequent operation.

The systems of the present subject matter generally comprise (i) a registration and control component, typically provided by one or more computer servers or information processing units for issuing activation signal(s), (ii) one or more mobile electronic devices for communicating with one or more tools of interest and relaying activation signal(s) to the tools, and (iii) at least one tool including electronic data storage provisions, communication provisions, and electronic locking provisions, all of which are described in greater detail herein.

Generally, the tool(s) are initially provided with their electronic locking provisions deactivated. Thus, the tools can be used in a conventional fashion. If the tools are registered with the system, a tool owner or party with supervisory status is prompted to select an operating mode for the tool. One operating mode enables the tool to be used without supervision or control from the system. This mode is referred to herein as a "free mode" or "indefinite duration mode". If that mode is selected for the tool, the electronic locking provisions remain deactivated. Another operating mode referred to herein as a "supervised mode," enables the tool to be used for (i) a preset period of time (or until a specified time or date), or (ii) for a preset number of activation cycles, or (iii) until the first occurrence of either (i) or (ii). In the supervised mode, the tool owner or supervisor specifies one or both of (i) a maximum amount of cumulative time during which the tool is operational, and (ii) a maximum cumulative number of activation cycles during which the tool is operational. The tool owner or supervisor can also specify a time and date at which activation expires. The selections are stored in the data storage provisions of the tool. In certain embodiments, the system transmits an activation signal which is relayed to the tool by the mobile device thereby activating the electronic locking provisions and enabling tool operation. After receipt of the activation signal by the tool subsequent communication with the tool (and the system) is not required until the enabling parameter expires. Thus, the tool can be used at remote locations in which wireless signals are not present. In particular embodiments, operation of the tool is enabled upon resetting of a timer and/or a counter.

If the selected parameter is time of tool operation, during all instances of tool operation, the operation time is cumulatively measured. This measured cumulative operation time is continuously compared to the maximum amount of cumulative time previously specified and stored in the tool. Once the measured cumulative time of tool operation is greater than the specified maximum amount of cumulative time, the electronic locking provisions are caused to disable tool operation. Disabling tool operation does not require communication between the tool and the system or mobile device.

If the selected parameter is number of activation cycles of the tool, all instances of tool activation are cumulatively measured. The measured cumulative number of activation cycles is continuously compared to the maximum cumulative number of activation cycles previously specified and stored in the tool. Once the measured cumulative number of activation cycles is greater than the specified maximum number of activation cycles, the electronic locking provisions are caused to disable tool operation.

If the limiting parameter is a set time/date, the internal real time clock compares actual time with the set expiration date. If expiration is reached, the tool is disabled.

It will be understood that the present subject matter includes the use of a variety of parameters to limit and/or govern tool use. That is, the present subject matter includes the use of different parameters and/or additional parameters than the time of tool operation, number of activation cycles of the tool, and/or a set time/date.

The tool(s) of the present subject matter do not require continuous and direct communication with the registration and control component. Instead and as previously described, in certain embodiments the registration and control component issues a one-time activation signal to the mobile device, which relays that signal to the tool of interest. And in certain versions, the tools are enabled by resetting timers and/or counters in the tool and thus no activation signals to the tools are required.

Registration and Control Component

The registration and control component receives information and data, retains information and data, administers access and use permissions, and governs user access to, and use of, tools registered with the system. The registration and control component in many embodiments of the present subject matter is provided by one or more computer servers or units which may be remotely located. As described herein, typically the one or more registration and control component(s) is accessed via the internet and can include cloud-based storage, processing, and/or communication.

The registration and control component includes a database and/or data storage provisions in which user information is retained. Nonlimiting examples of such information include user name; registrant name if different than the user name; company or organization name; contact information of user, registrant, and/or company; date of initial registration of user and/or tool(s) and optionally dates of subsequent registrations or logins; password(s) and other confidential information relating to the user, registrant, and/or company; designation or status of the user, registrant, and/or company, e.g., industrial, contractor, builder, or home user; location of registered user and/or tool; preset or predesignated tool parameters; actual use-based tool parameters; warnings or indicators associated with registered tools and/or users; status of warnings or indicators; and a wide array of other information and data such as the IP address used to register the tool or to enable the tool.

The registration and control component may include communication provisions so that the component can exchange, transmit, and/or receive information or data from the one or more mobile electronic devices. In many embodiments of the present subject matter, the registration and control component includes internet communication provisions.

In many versions of the present subject matter, the systems and particularly the registration and control component use cloud-based storage and/or cloud-based processing and thus can be accessed and implemented in a distributed fashion using remotely located servers or other computers. Typically such servers, computers or other devices are accessed via the internet.

Cloud-based storage and/or processing refers to online storage and/or processing by which data is virtually stored and/or processed across one or multiple servers, which are typically hosted by service providers. The term "cloud-based computing" refers to one or more of cloud-based data storage, cloud-based data processing, and/or cloud-based data communication. The service providers may include data center operators, which virtualize resources based on customer requirements. The storage services may be accessed via web service application programming interfaces (API) or via web-based user interfaces (UI). Cloud-based computing is described in the prior art such as for example in WO 2013/141868; US 2012/0060165; WO 2013/119247; and US 2011/0153868.

Mobile Electronic Device(s)

The present subject matter system also comprises one or more mobile electronic devices. The mobile devices can be in a variety of forms such as smartphones, tablet computers, or laptop computers for example. More particularly, the mobile device includes a computing device that may be a small-form factor portable (or mobile) electronic device such as a mobile phone or smartphone, or, alternatively, a personal data assistant (PDA), a personal media player device, an application specific device such as a tablet or slate computing device, or a hybrid device that may include any of the above functions. Nonlimiting examples of smartphones include devices running on ANDROID or IPHONE, e.g., iOS, platforms. Nonlimiting examples of tablet computing devices include IPAD available from Apple Corporation. Nonlimiting examples of a personal media player device is an IPOD or more particularly an IPOD TOUCH available from Apple. The mobile device may also be in the form of a personal computer including both laptop computer and non-laptop, e.g., desktop, computer configurations.

The mobile devices include electronic data storage provisions, control provisions, communication provisions, and user interface provisions. The data storage provisions of the mobile devices enable information relating to tool use, user information, and data and/or permissions from the registration and control component to be stored and/or accessed at the mobile device. The data storage provisions can be in the form of known data storage formats such as flash memory components. The data storage provisions may also include or be in the form of memory cards, disk or drive components, data cartridges or components such as ROM or RAM memory, and peripheral data storage components.

The control provisions of the mobile devices typically include electronic circuitry and generally in the form of one or more processors. In many embodiments, the mobile devices control data and/or information exchange or transmission with one or more tools registered with the system. As previously described, the mobile devices relay activation signal(s) issued from the registration and control component to the tool(s).

The mobile devices also include communication provisions between the mobile device and one or more tools; and between the mobile device and the registration and control component. Communication between the mobile device and the tool(s) can be established or provided using one or more communication formats such as radio frequency (RF), infrared (IR), and/or BLUETOOTH as known in the art. In particular embodiments, communication is by a wireless local area network (WLAN), i.e., Wi-Fi. The present subject matter also includes the use of other types of communication such as near-field communications (NFC). A nonlimiting list of other potentially suitable wireless protocols for communication between the mobile device and tool(s) of interest include ZIGBEE, GLOWPAN, Wireless HART, ISA 100, WiMi, SimpliciTI, KNX, EnOcean, Dash7, WISA, ANT, ANT+, WiMax, ONE-NET, Z-Wave, Insteon, and RuBee. In certain embodiments, communication between the mobile device and tool(s) can also be established by cables or other hardwired connections.

Mobile devices may be communicatively coupled to cloud-based service and data centers and/or a third party entity via, e.g., at least a wireless local area network technology (WLAN), i.e., Wi-Fi. However, embodiments of local access to cloud-based storage are not limited to wireless communications, and therefore hard-wired communications may also apply to the embodiments described herein.

The mobile devices also include communication provisions between the mobile device and the registration and control component. Typically, such communications are via the internet, and utilize a cloud-based infrastructure. However, the present subject matter also includes the use of other communications between the mobile devices and the registration and control component.

The mobile devices also include one or more user interface provisions. In a particular embodiment of the present subject matter, the mobile device is in the form of a smartphone or portable electronic computer for example an IPAD. The mobile device may also include a keyboard which can be virtual or provided as a physical input device incorporated in the mobile device or separate therefrom but connectable thereto. Other input components can be used such as mouses, track balls, and joysticks for example. The mobile device typically also includes a display or other information output so that information can be displayed for viewing by a user. Again, the display is typically incorporated within the mobile device, but the present subject matter includes the use of separate but connectable displays.

As previously noted, the mobile devices also include electronic data storage provisions and control provisions. In many embodiments of the present subject matter, the mobile device is configured to run or execute an algorithm or "app" as known in the art which facilitates communication with the registration and control component and/or the tool. Apps, their transfer or download, and running and maintenance thereof are described in the prior art such as for example in U.S. Pat. No. 8,549,656; US 2013/0122861; WO 2013/163249; and WO 2012/155937. The algorithm or app may also facilitate administration of permissions from the registration and control component, transmission of data or information between the registration and control component and the mobile device, and/or the mobile device and the tool(s) of interest. The algorithm or app may additionally facilitate user access, use of one or more tools of interest, and/or provide indications and/or warnings to a user concerning the tools and/or the system.

FIG. 1 schematically illustrates an embodiment of a system 10 in accordance with the present subject matter. The system 10 comprises one or more tools 20, one or more mobile devices 30, and a registration and control component 40. In many embodiments of the present subject matter, the system 10 also comprises a cloud-based infrastructure 50 for providing communication between the registration and control component 40 and the one or more mobile devices 30.

The system 10 comprises one or more communication links between the tool(s) 20 and the mobile device(s) 30 collectively shown in FIG. 1 as link(s) A. More particularly, other nonlimiting examples of tools include a drill 22 which can communicate with the mobile device 30 via link(s) A', a table saw 24 which can communicate with the mobile device 30 via link(s) A", and a miter saw 26 which can communicate with the mobile device 30 via link(s) A'". Additional nonlimiting examples of tools include measurement devices such as thermal cameras or inspection devices such as drain inspection cameras. The system 10 also comprises one or more communication links between the mobile device(s) 30 and the cloud-based infrastructure 50 collectively shown in FIG. 1 as link(s) B. The system can also comprise additional mobile device(s) collectively depicted as 30' which can communicate with the cloud 50 via link(s) B'. The system 10 also comprises one or more communication links between the registration and control component 40 and the cloud-based infrastructure 50 collectively shown in FIG. 1 as link(s) C. It is contemplated that communication link(s) could also be provided directly between the registration and control component 40 and the mobile device(s) 30. In addition, the system 10 can comprise one or more personal computers (PCs) or laptop computers 60 which can communicate via link(s) D with the registration and control component 40. And, the system 10 can also comprise one or more personal computers (PCs) or laptop computers 65 which can communicate with the cloud 50 via link(s) E. The present subject matter also includes variations of these systems. For example, computers 60 and/or 65 can also be configured to communicate with the tool(s). Thus the computers 60, 65 serve a role of the mobile device 30.

In certain embodiments, the mobile device can be configured as a "trusted" device. In this aspect, the mobile device can receive, store, and/or issue one or more actuation code(s) that can be used repeatedly. In this aspect, it is also contemplated that repeated issuance of an actuation code may not require communication between the trusted mobile device and the registration and control component.

Tool(s)

The present subject matter system also comprises one or more tools having electronic data storage provisions, electronic control circuitry, and communication provisions. As previously noted, the tools may be in the form of various devices such as cameras, or measurement or inspection devices. In many embodiments, the tools also comprise electronic lock or locking provisions. Typically, the tools are electrically powered or at least include electrical controls. In many embodiments, the tools are hand-held tools however the present subject matter includes other tools or tool systems such as stationary or non-mobile tool systems such as floor standing equipment or transportable or bench top tools. One or multiple tools can be utilized with the registration and control component and the mobile devices. Nonlimiting examples of tools include press tools, crimping tools, inspection or remote viewing systems, locating equipment, rotary powered tools including drills, grinders, impact tools, powered wrenches, expansion tools, shaping or forming tools, table saws, circular saws, miter saws, and the like. A wide array of tools are encompassed by the present subject matter.

The electronic data storage provisions are typically incorporated in the tool and can be in the form of known data storage formats such as flash memory components. The data storage provisions may also include or be in the form of memory cards, disk or drive components, data cartridges or components such as ROM or RAM memory, and peripheral data storage components. The electronic control circuitry includes one or more electronic processors configured to implement and execute the systems and methods described herein. The communication provisions are typically selected in view of the communication provisions of the mobile device(s). A wide array of communication formats can be used for the tool including but not limited to radio frequency, infrared, BLUETOOTH, Wi-Fi, near-field communications, and cable-based communications. The previously noted communication protocols can be used for tool communication.

Figure 2:
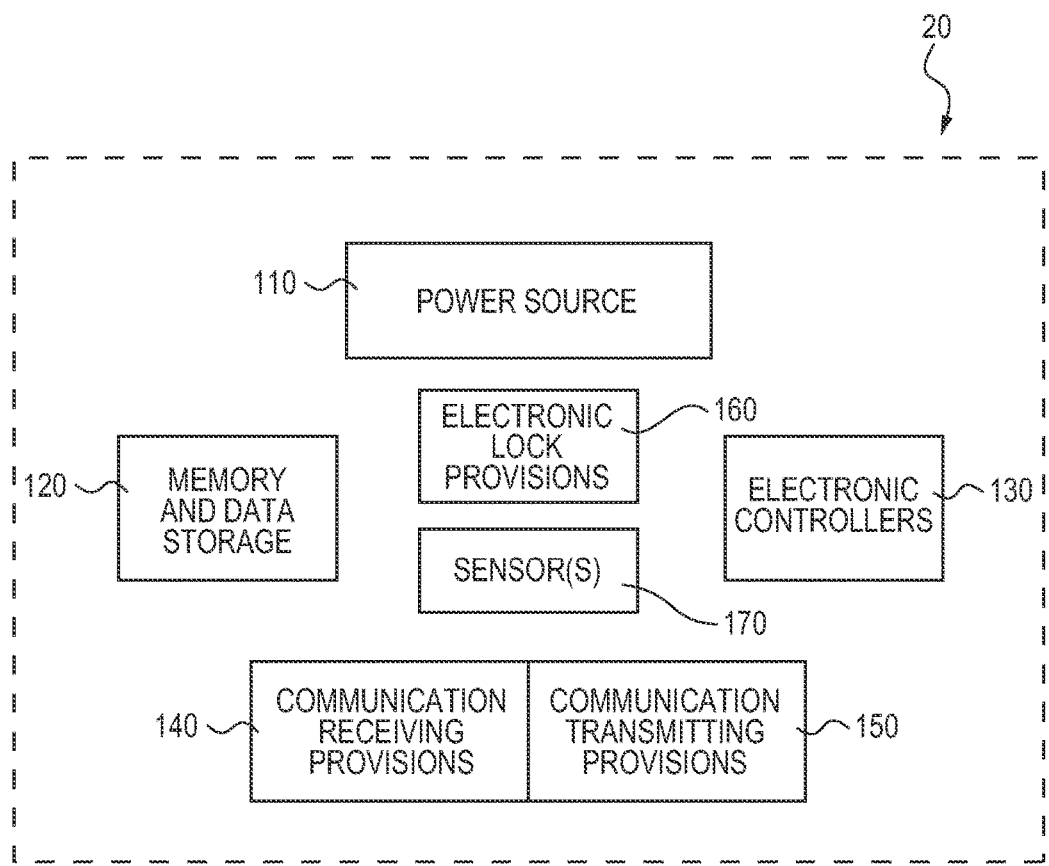
FIG. 2 is a schematic illustration of components incorporated in a tool in accordance with the present subject matter.

FIG. 2 is a schematic illustration of components incorporated in a tool 20 of the present subject matter. The tool 20 generally comprises a power source 110 which typically includes one or more batteries and/or a source of external electrical power, memory and data storage provisions 120, one or more electronic controllers 130, communication receiving provisions 140, and communication transmitting provisions 150. The electronic controllers 130 typically include microprocessor based circuits that can be configured to perform a wide array of tool operation and control functions. The electronic controllers 130 also include locks and/or the measurement circuits. For versions of the tool that include provisions for the tool to become disabled upon expiration of one or more particular time periods and/or upon reaching a particular time/date, any of which can potentially be prescribed by a user, the tool includes a real time clock and/or a timer. The measurement circuits can also include one or more "counters" that can be configured to count various aspects of tool operation such as a number of tool actuations. The tool 20 may also comprise electronic lock provisions 160 as described in greater detail herein. And, the tool 20 may also comprise one or more sensors collectively shown as 170 to sense one or more parameters, typically in real-time relating to tool use, operating conditions, and/or ambient conditions. Nonlimiting examples of such sensors include temperature sensors, pressure sensors, force sensors, electrical current sensors, electrical voltage sensors, accelerometers, counters, and time sensors to measure time periods of use or particular conditions of use. Many currently available tools and tool systems include electronic controls for operating the tool. Thus, one or more of components 110, 120, and 130 may in certain applications be readily configured in the tool(s) of interest. The communication provisions 140, 150 as previously described correspond to the communication format of the mobile device(s).

The electric or electronic lock provisions incorporated in tools of the present subject matter can take a variety of different forms and configurations. The lock provisions can be configured to enable tool use upon receiving an activation signal. The activation signal can be issued from the registration and control component and/or the mobile device, or be based upon signals from both. Typically, the activation signal is issued from the registration and control component and relayed by the mobile device to the tool.

The electronic lock provisions can be in the form of algorithm instructions executed entirely or at least partially by electronic circuitry in the tool. If such virtual electronic lock provisions are executed partially by the tool, the other algorithm instructions can be executed at the mobile device and particularly using the noted app. Alternatively or in addition, it is also contemplated that algorithm instructions can also be executed at the registration and control component.

The electronic lock provisions can also include one or more physical components such as a switch that connects or disconnects actuation circuit(s) and/or power supplies of the tool(s). In certain embodiments, the electronic lock provisions utilize one or more field effect transistors (FET) to provide switching or activation of the tool of interest. These circuits when used for enabling tool operation as described herein are referred to as FET-based electronic lock provisions. The present subject matter electronic lock provisions can be provided in a wide array of formats and configurations.

Methods

The present subject matter also provides various methods and techniques for governing and monitoring use of tool(s) registered in the system. Generally, many of the methods involve initially registering or updating a previously registered tool with the system and particularly with one or both of the registration and control component and/or the mobile device(s).

Figure 3:
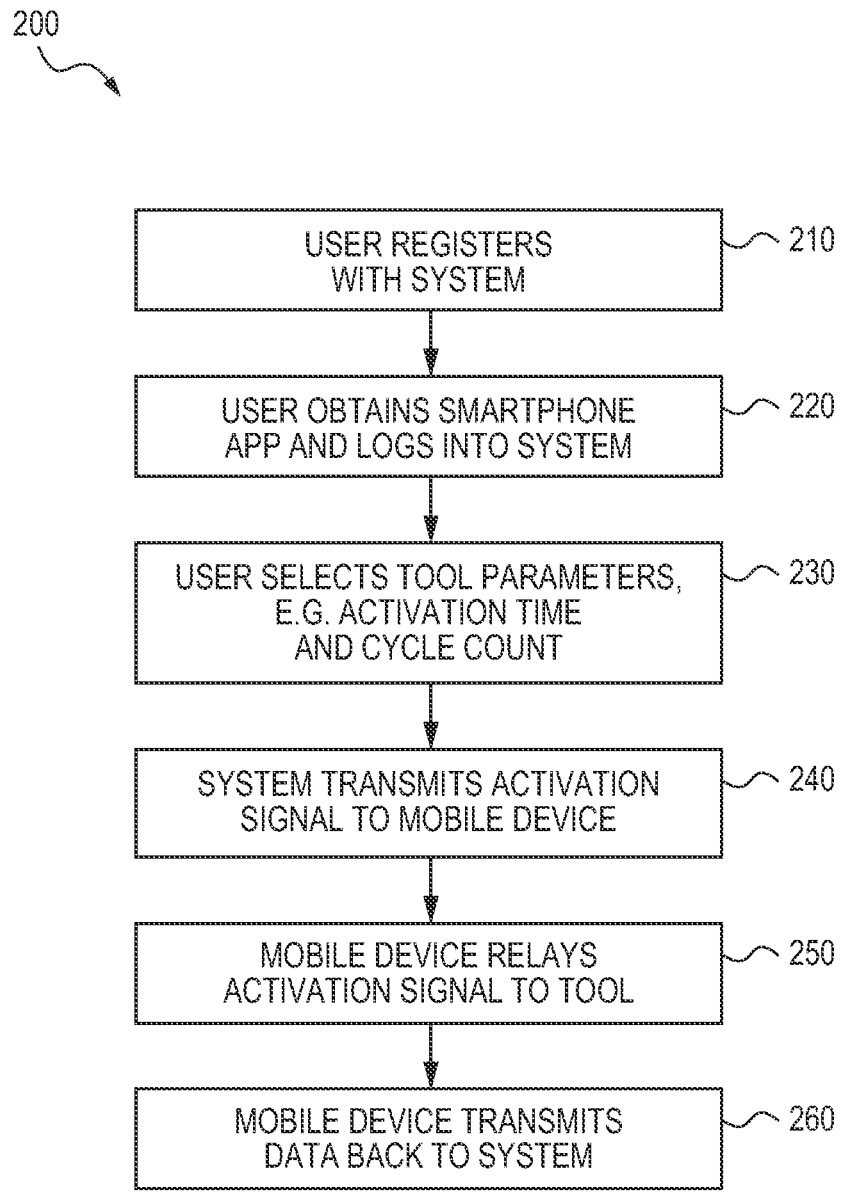
FIG. 3 is a schematic diagram illustrating a method of registering a tool with a system and continued use of the tool in accordance with the present subject matter.

FIG. 3 schematically depicts a method 200 in accordance with the present subject matter in which a tool is registered with a system such as registering the tool 20 with the system 10 in FIG. 1. The method 200 shown in FIG. 3 comprises one or more operations in which a user registers himself or herself with a system. These operations are collectively denoted as 210 in FIG. 3. The user registration operations may include the user providing identifying information, contact information, and information pertaining to the tool(s) of interest. The user registration operations may also include assigning a unique password and/or identification to the user.

The method 200 also comprises one or more operations collectively denoted as 220 in which the user utilizing one or more mobile devices, establishes identification between a mobile device such as a smartphone for example and the registration and control component. The operations 220 may also include obtaining or otherwise downloading an algorithm or app to the mobile device, to facilitate user control and operation of the tool(s) of interest and/or to facilitate communication and/or data exchange between one or both of (i) the tool and the mobile device, and (ii) the registration and control component. In many embodiments of the present subject matter, operations 220 are performed by a user establishing communication between the mobile device and the registration and control component, downloading an algorithm or app to the mobile device, and then using the algorithm or app and the mobile device, and entering a unique user password to log into the user's registration data or account maintained at the registration and control component.

Once logged into their account, a user may select one or more tool parameters and/or other items associated with the tool, user, and the like. These operations are collectively depicted in FIG. 3 as 230. For example, after logging into their account, a user can select how long a tool of interest shall remain operational. For example, a user may select an activation time period of 24 hours, 1 week, 2 weeks, 1 month, 3 months, 6 months, or other time period. It will be understood that the present subject matter includes selection of activation time periods less than these, greater than these, and/or different than these time periods. In certain embodiments, the system and/or tool is configured such that if an activation time period of 1 month is selected, the tool of interest will remain operational at any time up to 1 month. After expiration of the 1 month activation time period, the tool is disabled and cannot be used until corrective action is taken. An example of such corrective action is a user logging into the system and re-activating the tool to cause the system to issue an activation code or electronic signal to the tool. In addition in certain embodiments, a user can select how many cycles or intervals of operation are permitted for a tool. For example, a user may select a number of cycles or intervals of operation as 10 cycles, 100 cycles, 500 cycles, 1,000 cycles, 10,000 cycles, or any other number of cycles. In addition in certain embodiments, a user can select permitted operating ranges of tool(s). Alternatively, or in addition, a user can select certain parameters of the tool or use of the tool, which if sensed or experienced result in the tool being rendered inoperable. For example, if a certain number of cycles of tool use are exceeded, the tool is disabled. These and other user selectable parameters can be set during operation 230. These parameters can be entered and stored into the system at the registration and control component, the mobile device, or both. Regardless, the parameters are stored in the tool.

In certain embodiments, the method 200 also comprises one or more operations collectively denoted as 240 in FIG. 3, of transmitting an activation signal to the mobile device. The operation(s) 240 can also include establishing a communication link between the mobile device and the registration and control component. This link is schematically shown in FIG. 1 as links B, C. And, in certain embodiments, the method 200 additionally comprises one or more operations collectively shown as 250 in FIG. 3, of relaying the activation signal to the tool. The operation(s) 250 can also include establishing a communication link between the mobile device and the tool, which is schematically shown in FIG. 1 as link A. The method 200 can also include one or more operations 260 in which the mobile device transmits data to the system.

In many embodiments, during or after establishing communication link(s) between the mobile device and the tool of interest, an activation code or permission is transmitted or otherwise provided to the tool. Typically, the activation signal is issued from the system and relayed by the mobile device to the tool. Receipt of the activation code by the tool typically enables operation of the tool. The activation code or permission can be issued by the registration and control component and then relayed from the mobile device to the tool. Alternatively and as described in greater detail herein, in certain embodiments the system and tool(s) are configured such that the tool is initially enabled or permitted to operate and thus does not require an initial activation signal from the registration and control component and/or the mobile device. For example, a tool having electronic locking provisions can initially be provided by a manufacturer or supplier with such provisions in a deactivated state thereby allowing tool operation.

Figure 4:
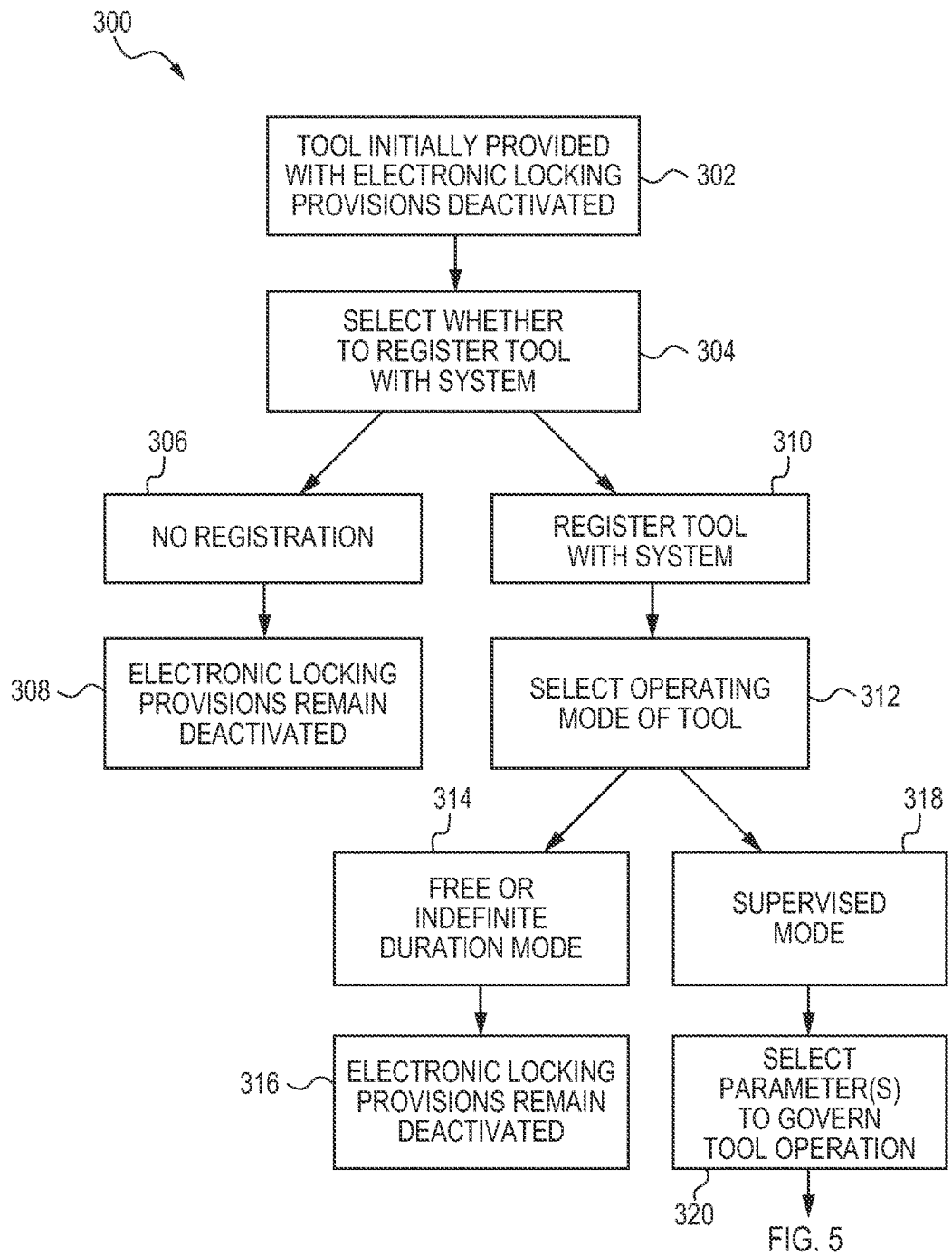
FIGS. 4-6 are schematic diagrams illustrating methods of governing tool use in accordance with embodiments of the present subject matter.
Figure 5:
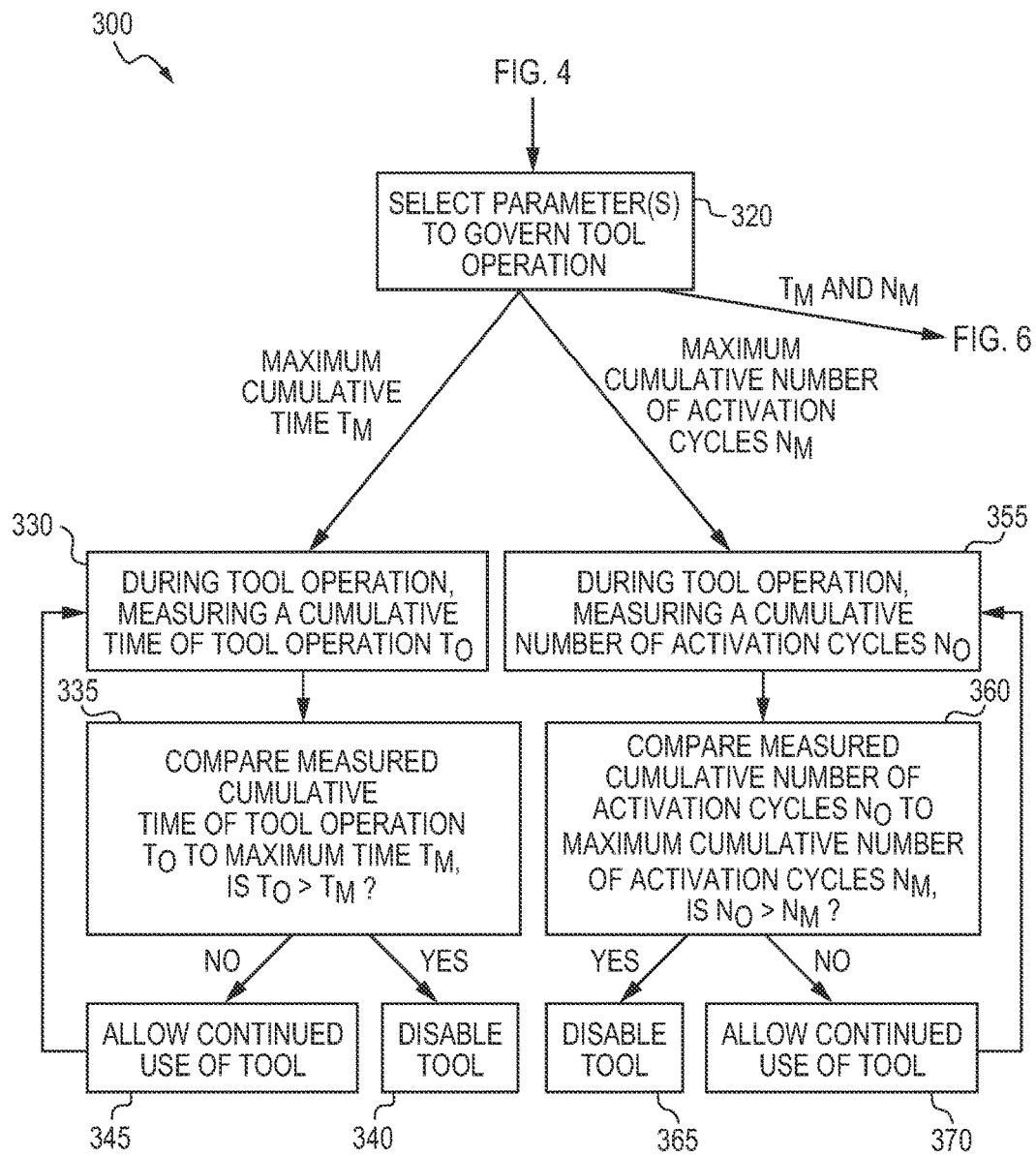
Figure 6:
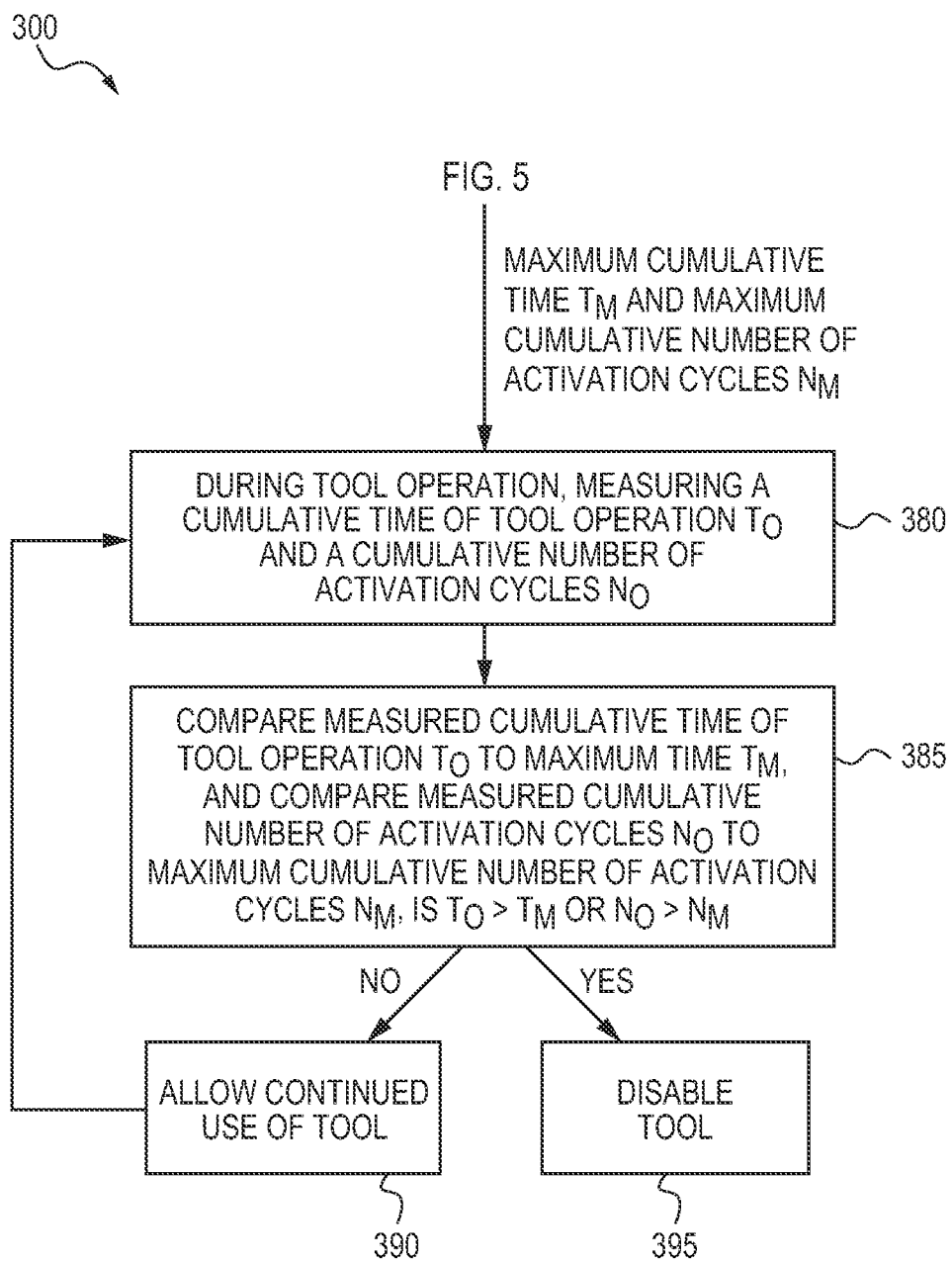

FIGS. 4-6 schematically illustrate methods of governing tool use in accordance with the present subject matter. In a method 300, a tool is initially provided with its electronic locking provisions deactivated. In this state, the tool can be operated in a conventional manner. This is shown in FIG. 4 as 302.

In operation 304, the tool user, owner, or other party selects whether to register the tool with the system. If the party decides to not register the tool, denoted at 306, then the electronic locking provisions remain deactivated as shown at 308.

If the party decides to register the tool with the system, denoted at 310, the party is then prompted at 312 to select an operating mode for the tool. If a "free" or "indefinite duration" mode (also referred to as an "infinite" or "infinite duration" mode) is selected, shown as 314, then the electronic locking provisions remain deactivated as depicted at 316.

If the party decides to register the tool and selects a "supervised" mode shown as 318, the party is then prompted to select one or more parameter(s) to govern tool operation. The parameters may include a maximum cumulative time Tm, a maximum cumulative number of activation cycles Nm, or both of these parameters. This is denoted in FIG. 5 as 320. It will be appreciated that the present subject matter is not limited to the use of these parameters and includes the use of one or more other parameters.

If the owner or supervisor selects maximum cumulative time Tm for governing tool operation, a timer is reset and the electronic locking provisions enable tool operation.

During tool operation, the tool measures a cumulative time of tool operation To, which is shown in FIG. 5 as 330. The measured cumulative time of tool operation To is compared to the maximum cumulative time of tool operation previously specified at 320. This comparison is depicted in FIG. 5 as 335. If To is greater than Tm, any further operation of the tool is prevented. The tool is disabled, as shown at 340. If however, To is less than Tm, the tool is allowed to operate as shown at 345. During further tool operation, the cumulative time of tool operation is measured, hence the method is repeated from operation 330, to comparison 335, to one of the results 340 or 345. If result 345 occurs, the method is again repeated from 330 as previously described.

If the owner or supervisor selects a maximum cumulative number of activation cycles Nm for governing tool operation, a counter is reset and the electronic locking provisions enable tool operation.

During tool operation, the tool measures a cumulative number of activation cycles No, which is shown in FIG. 5 as 355. The measured cumulative number of activation cycles No is compared to the maximum cumulative number of activation cycles Nm previously specified at 320. This comparison is shown in FIG. 5 as 360. If No is greater than Nm, then any further operation of the tool is prevented. The tool is disabled, as shown at 365. If however, No is less than Nm, the tool is allowed to operate as shown at 370. During further tool operation, the cumulative number of tool activation cycles is measured, hence the method is repeated from operation 355, to comparison 360, to one of the results

365, 370. If result 370 occurs, the method is again repeated from 355 as previously described.

If the owner or supervisor selects to disable the tool upon a first occurrence of either the maximum cumulative time Tm and the maximum cumulative number of activation cycles Nm, the previously noted timer and counter are reset. The tool is enabled for operation.

During tool operation, the tool measures both a cumulative time of tool operation To and a cumulative number of activation cycles No as shown at 380. The method compares the measured signals to the corresponding maximum cumulative time of tool operation Tm and the maximum cumulative number of activation cycles Nm previously specified. This comparison is shown in FIG. 6 as 385. If either (i) To is greater than Tm or (ii) No is greater than Nm, then any further operation of the tool is prevented. The tool is disabled, as shown at 395. If however, both (i) To is less than Tm and (ii) No is less than Nm, the tool is allowed to operate as shown at 390. During further tool operation, the cumulative time of tool operation and the cumulative number of tool activation cycles are measured, hence the method is repeated from operation 380, to comparison 385, to one of the results 390, 395. If result 390 occurs, the method is again repeated from 380 as previously described.

Figure 7:
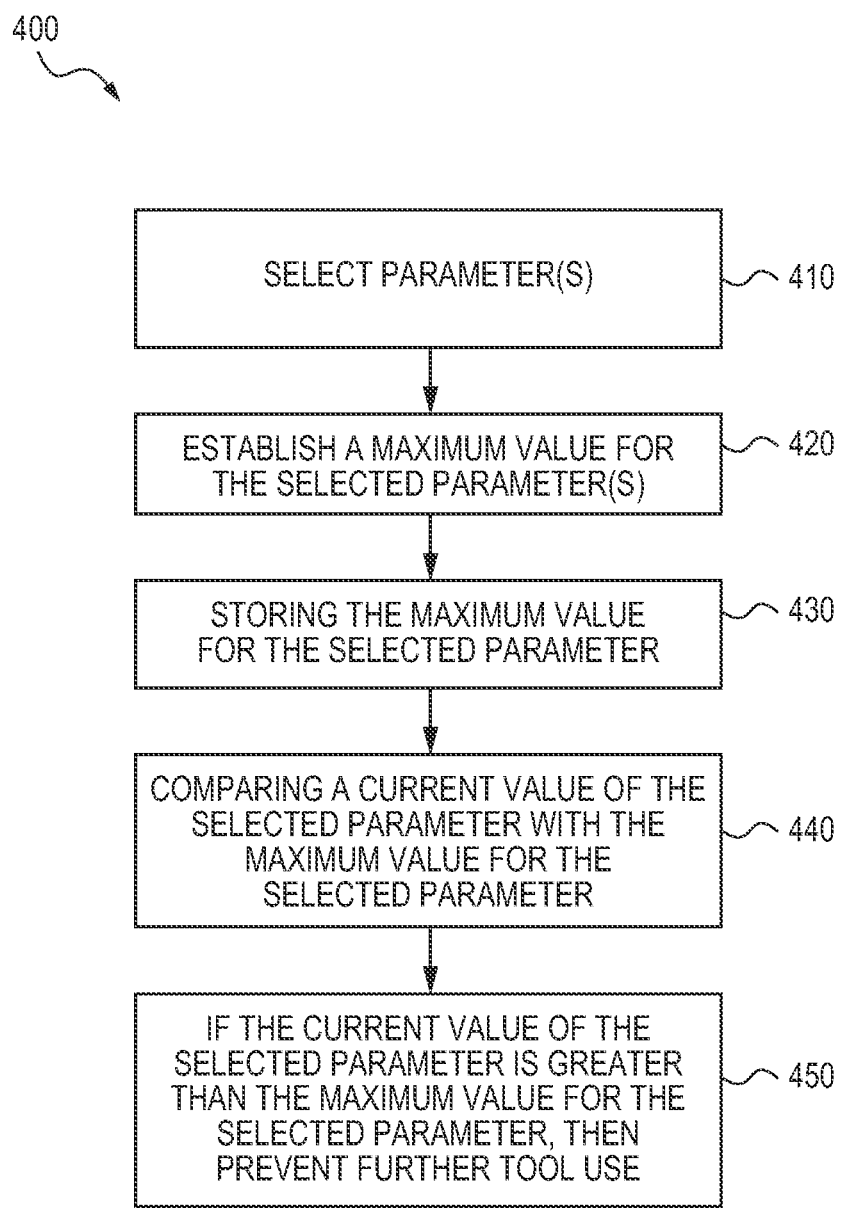
FIG. 7 is a schematic diagram illustrating another method of governing use of a tool in accordance with an embodiment of the present subject matter.

Thus, in particular versions of the present subject matter, methods are provided for governing use of one or more tools by selecting one or more parameters and designating maximum values or limits for the selected parameters, monitoring one or more selected parameters, and comparing current values to the designated maximum values. As previously described, nonlimiting examples of such parameters include an activation time period for the tool and a number of activation cycles. FIG. 7 schematically illustrates such a method 400. Generally, a method for controlling use of a tool comprises providing a system including (i) a registration and control component, (ii) at least one mobile electronic device, and (iii) at least one tool including electronic locking provisions. The mobile device is in communication with the registration and control component, and the electronic locking provisions are configured to enable operation of the tool. In certain embodiments, enabling the tool may require receipt of an activation signal. In other embodiments, the tools do not require an activation signal for operation. The method also comprises selecting at least one parameter which for example may be selected from the group consisting of (i) an activation time period, and (ii) a number of activation cycles. This is depicted in FIG. 7 as 410. The method also comprises establishing a maximum value for the selected parameter(s). This is shown as 420 in FIG. 7. For example, if the selected parameter is a tool activation time period, the maximum value for that parameter may be selected to be 1 month. Another example may be if the selected parameter is a number of tool activations, i.e., discrete uses of the tool, the maximum value for that parameter may be selected to be 500 activations. The method also comprises storing the maximum value for the selected parameter(s) on the tool. This is shown as 430 in FIG. 7. The method also comprises comparing a current value of the selected parameter with the maximum value for the selected parameter. This is shown as 440 in FIG. 7. If the current value of the selected parameter is greater than the maximum value for the selected parameter, then further use of the tool is prevented, such as shown at 450. In particular versions of the method 400, the selected parameter is an activation time period in the form of an expiration date and the tool further includes data storage provisions. The method further comprises storing the expiration date in the data storage provisions in the tool. In this embodiment, the tool includes a real time clock. The comparing is performed by comparing the expiration date stored in the data storage provisions with a real time date provided by the system, and if the real time date is after the expiration date, the electronic locking provisions of the tool are actuated to thereby disable operation of the tool. It will be understood that the present subject matter includes the use of a wide array of parameters for governing tool use. Thus, the present subject matter is not limited to the particular examples of an activation time period and/or a number of activation cycles.

In still additional embodiments, the tool can be configured to monitor time of use. This aspect is beneficial in a number of applications. For example, monitoring total time of use when using certain cutter inserts with the tool is beneficial. After exceeding a particular total time of use, the cutter inserts may need to be changed. After a certain amount of time, an LED or other indicator is actuated to indicate the required change of the cutter inserts. After the inserts have been changed, the user connects with a mobile device to reset the LED and a counter or timer. During this connection, data between the device (and subsequently the device and the server) is exchanged.

In certain embodiments, the present subject matter systems and methods provide an array of additional features and functions as follows.

Preventing Tool Use

In many embodiments of the present subject matter, the systems prevent use of one or more tools based upon particular criteria and/or conditions.

Typically, the tool includes electronic locking provisions configured to disable tool use without a requirement of a deactivation signal being transmitted to the tool. After disabling of a tool such as by previously configuring the tool, the system can be configured such that the tool remains inoperable until the user activates the tool by logging into the system and accessing his or her account with the registration and control component. Upon logging into their account and permitting use, a permission signal is transmitted to the tool such as from the mobile device to the tool by BLUETOOTH.

In particular embodiments, such as when logging into the system from a mobile device, the user can declare the device as his own and a permanent code can be issued to, and stored onto the device (or other trusted device). Now the device can be used any time to activate the tool without logging into the system. And thus, the permanent code serves as a "permanent key" for the tool. Alternatively, a "one-time code" can be issued that allows the user to use the device only once for tool activation. Before using the device a second time, the user must establish a new connection to the system and obtain a new code.

In many embodiments of the present subject matter, a tool adapted for use with the system is initially provided or sold with the electronic lock disabled or inactive. Thus, any user who does not wish to use the electronic lock or register the tool with the system, can use the tool in a conventional fashion and without any further action.

Monitoring Tool Use

In certain embodiments of the present subject matter, various aspects of tool use can be monitored. For example, the system can be configured to collect and store data relating to tool use and transmit such data to a mobile device for subsequent uploading or transfer to the registration and control component. In certain versions, the system collects information relating to the time and duration of tool use. This enables a party such as a business owner or jobsite supervisor to monitor whether any unauthorized use such as after hour use of the tool(s) has occurred.

The present subject matter systems can also be configured to monitor, store, and/or display status information relating to each tool of interest.

Providing Information to User

The present systems can also provide a wide array of information and data to a user concerning tool(s) of interest and their use. The systems can be configured to send automated emails or other communications such as text messages to designated users or other parties such as tool service reminders, notification of tool deactivation, or the like.

Memory or data storage provisions incorporated in a tool or in a mobile device which have received tool data, can provide information to a user for display or further processing. For example, statistical processing of tool use data can be performed to provide information to users, other parties, and/or tool manufacturers.

Particular Features

As will be appreciated, the present subject matter systems and methods can be configured to provide a wide array of particular features.

In certain embodiments, a tool in accordance with the present subject matter and including electronic lock provisions is initially provided, sold, and/or provided to a user with the electronic lock provisions set to infinite use. This provides the user with an option of whether to utilize the electronic lock provisions. If the user decides to not use the provisions, such as if the user does not have access to a computer, the tool can be operated in a conventional fashion. More specifically, in many embodiments of the present subject matter, the electronic locking provisions are activatable and typically activatable by a user, operator, supervisor, or other party. Typically, after manufacture and assembly of a tool and upon purchase of the tool, the electronic locking provisions are set to allow infinite use, thereby allowing tool operation regardless of whether the tool is registered or used with the systems described herein.

In certain embodiments, the activation signals issued by the registration and control component and relayed by the mobile device(s) include one or more activation codes that may include instructions for the tools and components of the tools. For example, the activation codes may include instructions for the tool and/or its electronic locking provisions to enable operation of the tool upon receipt of the activation code. The activation codes can be created or generated by the registration and control component and selectively issued to the mobile devices. Embodiments are also contemplated in which a mobile device is configured to store multiple activation codes. In this manner, if a tool became disabled in the field such as due to exceeding a maximum cumulative time of tool operation, an operator could use the mobile device to issue another activation signal with an activation code to enable the tool to be used again. This re-activation of the tool using the mobile device would not require communication between the mobile device and the registration and control component. Alternatively, the user can designate a mobile device as a "trusted device" that can enable tool use without further connection with the server.

In certain embodiments, tools and/or the system can be configured such that any comparing of a current value of a selected parameter, e.g., an activation time period, a number of activation cycles, and/or a tool use parameter, with a maximum value selected for that parameter is performed prior to use of a tool. And in particular embodiments, the tools and/or system can be configured such that the comparing is only performed prior to use of the tool. This enables a user to finish a particular use or application of the tool.

In certain embodiments, tools can be configured to only operate within a predetermined time period and/or within predetermined operating parameters such as up to a designated number of operating cycles.

In certain embodiments, the systems can be configured to transmit, store, and/or display information concerning tool(s) and their use such as cycle counts, pressure data, warnings, and the like. Specifically, in particular embodiments of the present subject matter various data concerning tool use is collected and stored on the tool. Nonlimiting examples of such data include dates and times when the tool was used; if the tool is a press or crimp tool, data concerning crimp pressure, size of fittings pressed, and other associated measurements; temperatures during tool use; number of tool uses or actuations; and other information collected from sensors incorporated in the tool. The various data is stored in electronic data storage provisions onboard the tool. The data can be transferred or transmitted to one or more mobile device(s) in a subsequent communication between the tool and the mobile device. Once transferred to the mobile device, the data or a portion thereof can be transferred to the registration and control component or to other components of the system as desired.

In certain embodiments, the systems can be configured to transmit reminders relating to tool service and activation details which are derived or determined from tool use data.

In certain embodiments, reminder signals or other notifications may be issued by the system prior to expiration of any tool deactivation time periods or cycle counts. Thus, prior to disabling of the tool, a reminder signal is issued to warn of the tool nearing a state of being disabled. For example, if a tool is configured with a one week use period, a warning can be issued by the system prior to expiration of the one week time period, such as for example 24 hours prior to expiration. This allows a user to then reset or otherwise actuate the tool prior to expiration and resulting tool deactivation. For example, depending upon configuration of the system, a user can establish communication between his smartphone and the tool and renew the activation time period using an app running on the smartphone.

In certain embodiments, the tools can be provided with one or more illuminated indicators that emit light upon the locking provisions being in a state that prevents tool operation. For example, the illuminated indicator could be a light emitting diode (LED) which is activated to emit light upon the locking provisions disabling tool use. Referring to FIG. 1, the tool 20 could include one or more illuminated indicators 20a and 20b that emit light such as red, yellow, or green light to indicate a locking state or other state of the tool.

The system can also be configured such that one or more tools can be activated or re-activated, using a primary or master activation or deactivation code.

The systems and/or electronic locking provisions allow tool use when a communication link is not established, such as if a data connection link between a tool and a mobile device cannot be established or is temporarily lost during tool use. Deferred updating of the tool use data and/or user information retained with the registration and control component can occur upon a subsequent data connection such as between the mobile device and the registration and control component, i.e., via the cloud.

In certain embodiments, the present subject matter also includes tools that include labels, tags, stickers, molded indicia, or other means to indicate that the tool includes electronic locking provisions. These are collectively referred to herein as "visual indicia." The visual indicia provide a clear visually perceptible warning that the tool includes anti-theft provisions, e.g., the electronic locking provisions and/or the additional aspects described herein. Referring to FIG. 1, the tool 20 is depicted as including visual indicia 20c which may for example be a label that is adhesively secured to the tool 20. The label 20c may convey that the tool includes electronic locking provisions and/or can be used with or registered with a system or database of the tool's manufacturer or supplier.

The present subject matter provides various advantages and benefits including the following. No permanent connection to a mobile device is required. Once activated, the tool can be used until one or more parameter(s) expire. No costly cell connection is required unlike other devices such as for example plug-in devices for cars. All communication is "relayed" via the mobile device, using data connection already associated with the mobile device and/or its use.

Many other benefits will no doubt become apparent from future application and development of this technology.

All patents, published applications, standards and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A system for governing use of a tool, the system comprising:
   a registration and control component;
   at least one mobile device remote from the registration and control component;
   a tool having data storage provisions, communication provisions, and electronic lock provisions, the electronic lock provisions initially provided to allow infinite use of the tool;
   wherein the system is configured such that upon communication between the mobile device and the registration and control component, the registration and control component issues a first signal to the mobile device thereby enabling communication between the mobile device and the tool, and the mobile device issues a second signal to the tool such that the electronic lock provisions of the tool are capable of disabling the tool without further communication from the registration and control component or the mobile device.

2. The system of claim 1, wherein the mobile device is a smartphone.

3. The system of claim 1, wherein communication between the mobile device and the registration and control component is via the internet.

4. The system of claim 3, wherein the communication between the mobile device and the registration and control component includes cloud-based infrastructure.

5. The system of claim 1, further including visual indicia indicating that the tool includes the electronic lock provisions.

6. The system of claim 5, wherein the visual indicia is in the form of a label affixed to the tool.

7. The system of claim 1, wherein the tool includes an illuminated indicator that emits light upon the electronic lock provisions being in a state that prevents tool operation.

8. The system of claim 7, wherein the illuminated indicator is in the form of a light emitting diode (LED).

9. The system according to claim 1, wherein after the tool is disabled, only the at least one mobile device is capable of reactivating the tool.

10. The system according to claim 1, wherein the tool is configured such that after expiration of a preset activation time period, the tool is disabled without further communication from the registration and control component or the mobile device.

11. The system according to claim 10 wherein the activation time period is selected from the group consisting of 24 hours, 1 week, 2 weeks, 1 month, 3 months, and 6 months.

12. The system according to claim 10 wherein the activation time period is set in the registration and control component or the mobile device.

13. The system according to claim 1, wherein the tool is configured such that after expiration of a preset date, the tool is disabled without further communication from the registration and control component or the mobile device.

14. The system according to claim 13, wherein the date is set in the registration and control component or the mobile device.

15. The system according to claim 1, wherein the tool is configured such that upon exceeding a preset number of tool actuations, the tool is disabled without further communication from the registration and control component or the mobile device.

16. The system according to claim 15 wherein the number of tool actuations is selected from the group consisting of 10 cycles, 100 cycles, 500 cycles, 1,000 cycles, and 10,000 cycles.

17. The system according to claim 15, wherein the number of tool actuations is set in the registration and control component or the mobile device.

18. The system according to claim 1, wherein the tool is configured such that upon exceeding a preset sensor condition, the tool is disabled without further communication from the registration and control component or the mobile device.

19. The system according to claim 18 wherein the sensor condition is provided by a sensor in the tool selected from the group consisting of temperature sensors, pressure sensors, force sensors, electrical current sensors, electrical voltage sensors, accelerometers, counters, and time sensors.

20. The system according to claim 19 wherein the sensor is an electrical current sensor.

21. The system according to claim 18, wherein the sensor condition is set in the registration and control component or the mobile device.

22. The system according to claim 1, wherein the tool is configured such that upon exceeding a preset number of sensed electrical current conditions, the tool is disabled without further communication from the registration and control component or the mobile device.

\* \* \* \* \*